(12) United States Patent
Cohen-Solal et al.

(10) Patent No.: US 7,742,073 B1
(45) Date of Patent: Jun. 22, 2010

(54) METHOD AND APPARATUS FOR TRACKING AN OBJECT OF INTEREST USING A CAMERA ASSOCIATED WITH A HAND-HELD PROCESSING DEVICE

(75) Inventors: Eric Cohen-Solal, Ossining, NY (US); Tomas Brodsky, Croton-on-Hudson, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1036 days.

(21) Appl. No.: 09/703,419

(22) Filed: Nov. 1, 2000

(51) Int. Cl.
*H04N 5/225* (2006.01)
(52) U.S. Cl. .................... 348/169; 348/172; 348/376
(58) Field of Classification Search ... 348/220.1–222.1, 348/231.99, 333.01, 376, 350, 169–172, 348/208.99, 208.1–208.7, 14.01–14.16; 358/906, 909; 382/181, 190–195, 203, 209
See application file for complete search history.

(56) References Cited

U.S. PATENT DOCUMENTS

| | | | | |
|---|---|---|---|---|
| 4,612,575 A | | 9/1986 | Ishman et al. ............... 358/160 |
| 4,864,409 A | * | 9/1989 | Platte et al. .............. 348/208.6 |
| 5,012,347 A | | 4/1991 | Fournier ..................... 358/222 |
| 5,453,800 A | | 9/1995 | Kondo et al. ................ 348/699 |
| 5,506,912 A | * | 4/1996 | Nagasaki et al. ............. 382/103 |
| 5,552,823 A | | 9/1996 | Kageyama .................. 348/155 |
| 5,581,309 A | | 12/1996 | Okino et al. ................. 348/699 |
| 5,612,732 A | * | 3/1997 | Yuyama et al. ........... 348/14.01 |
| 5,625,715 A | | 4/1997 | Trew et al. .................. 382/236 |
| 5,734,933 A | | 3/1998 | Sekine et al. .................. 396/55 |
| 5,757,422 A | | 5/1998 | Matsumura ................. 348/169 |
| 5,812,193 A | * | 9/1998 | Tomitaka et al. ............. 348/369 |
| 5,825,415 A | * | 10/1998 | Kaneda et al. ............ 348/208.6 |
| 5,949,481 A | | 9/1999 | Sekine et al. ............... 348/208 |
| 6,005,609 A | * | 12/1999 | Cheong ...................... 348/169 |
| 6,035,067 A | | 3/2000 | Ponticos ..................... 382/226 |
| 6,100,927 A | * | 8/2000 | Ogino .................... 348/208.14 |
| 6,195,122 B1 | * | 2/2001 | Vincent ...................... 348/169 |
| 6,253,032 B1 | * | 6/2001 | Van Den Herik ............ 396/374 |
| 6,323,898 B1 | * | 11/2001 | Koyanagi et al. ........... 348/169 |
| 6,556,235 B1 | * | 4/2003 | Saburi ..................... 348/14.02 |
| 6,600,657 B1 | * | 7/2003 | Yerazunis et al. ............ 361/737 |
| 6,704,048 B1 | * | 3/2004 | Malkin et al. ............ 348/240.2 |
| 6,781,622 B1 | * | 8/2004 | Sato et al. ................ 348/208.4 |

(Continued)

FOREIGN PATENT DOCUMENTS

EP 0456414 A2 11/1991

(Continued)

OTHER PUBLICATIONS

Hartley, "Self-Calibration of Stationary Cameras", May 1997, International Journal of Computer Vision, pp. 5-23.*

*Primary Examiner*—Kelly L Jerabek

(57) ABSTRACT

A hand-held processing device, such as a mobile telephone, a personal digital assistant (PDA), or a portable computer, includes a physically or electronically adjustable camera and is operative to track a specified object of interest. Relative movement between the hand-held device and the object of interest is detected using an orientation determination device such as a gyroscope, an image-based tracking operation, or a hybrid combination of orientation determination and image-based tracking. A setting of the camera is then adjusted so as to maintain a desired framing of the object of interest within an image generated by the camera.

25 Claims, 5 Drawing Sheets

U.S. PATENT DOCUMENTS 6,781,623 B1 * 8/2004 Thomas .................. 348/208.4
2002/0101517 A1 * 8/2002 Leppisaari et al. .......... 348/231

FOREIGN PATENT DOCUMENTS

| | | |
|---|---|---|
| EP | 0638817 A2 | 2/1995 |
| EP | 0703703 A2 | 3/1996 |
| EP | 0789487 A2 | 8/1997 |
| EP | 0579319 B1 | 4/1998 |
| EP | 0884905 A2 | 12/1998 |
| GB | 2330269 A | 4/1999 |

* cited by examiner

METHOD AND APPARATUS FOR TRACKING AN OBJECT OF INTEREST USING A CAMERA ASSOCIATED WITH A HAND-HELD PROCESSING DEVICE

FIELD OF THE INVENTION

The present invention relates generally to the field of hand-held processing devices, and more particularly to techniques for tracking a person or other object of interest using a camera integrated in or otherwise associated with a personal digital assistant (PDA), mobile telephone, or other type of hand-held processing device.

BACKGROUND OF THE INVENTION

Hand-held processing devices such as PDAs and mobile telephones have recently been configured to incorporate or support a digital camera. For example, PDAs such as the Palm Pilot™ and Handspring Visor™ are now configured to support attachable digital camera modules, as described in Cyberscope, "Gadgets From the Desert," Newsweek, Feb. 21, 2000, page 9. An example of a mobile telephone which incorporates a digital camera is the VisualPhone VP-210 from Kyocera, http://www.kyocera.co.jp. These and other hand-held devices which incorporate or support digital cameras can be used in a variety of image processing applications, including applications such as taking still pictures or video, and video telephone services ("visiophony").

A significant problem which can arise in the above-noted conventional hand-held devices is the lack of stability of the image content as the user manipulates the device. For example, in visiophony or other applications involving a video signal generated by a camera, it is generally desirable to have the camera automatically frame and track the user or another object of interest. This framing and tracking process not only provides a more useful video signal in terms of its information content, but also facilitates compression of the video for subsequent transmission. Unfortunately, the conventional hand-held devices described previously fail to provide effective framing and tracking features for their associated digital cameras. A need therefore exists for techniques for providing such features in hand-held processing devices which incorporate or support a digital camera.

SUMMARY OF THE INVENTION

The invention provides methods and apparatus for tracking an object of interest using a camera integrated into or otherwise associated with a mobile telephone, a personal digital assistant (PDA), a portable computer or other type of hand-held processing device. In accordance with the invention, the hand-held processing device includes a physically or electronically adjustable camera, such as a mechanical or electronic pan-tilt-zoom (PTZ) camera. Relative movement between the hand-held processing device and the object of interest is detected, and at least one setting of the camera is adjusted so as to maintain a desired framing of the object of interest within an image generated by the camera.

In a first illustrative embodiment of the invention, the relative movement between the hand-held processing device and the object of interest is detected using an orientation determination device such as a gyroscope or an arrangement of multiple gyroscopes. The gyroscope(s) may be integrated into or otherwise associated with the hand-held device.

In a second illustrative embodiment of the invention, the relative movement between the hand-held processing device and the object of interest is detected using image-based tracking operations. A model of the object of interest within a given image generated by the camera is computed upon initialization of the image-based tracking, and subsequent images are analyzed to detect the relative movement. Appropriate adjustments are then made to the camera settings to maintain the desired framing of the object of interest within the subsequent images.

Other embodiments of the invention may utilize a hybrid combination of the above-noted orientation determination and image-based tracking approaches.

Advantageously, the present invention allows a mobile telephone, PDA or other hand-held processing device to track a designated object of interest in a computationally efficient manner. By correctly framing a face or other object of interest, the invention can ensure that only the most meaningful image information is displayed to a user, which is an increasingly important advantage as the display dimensions of hand-held devices continue to decrease. The invention is particularly well-suited for providing face tracking and image stabilization in visiophony applications, but can also provide considerable advantages in other hand-held device tracking applications. These and other features and advantages of the present invention will become more apparent from the accompanying drawings and the following detailed description.

DETAILED DESCRIPTION OF THE INVENTION

Figure 1:
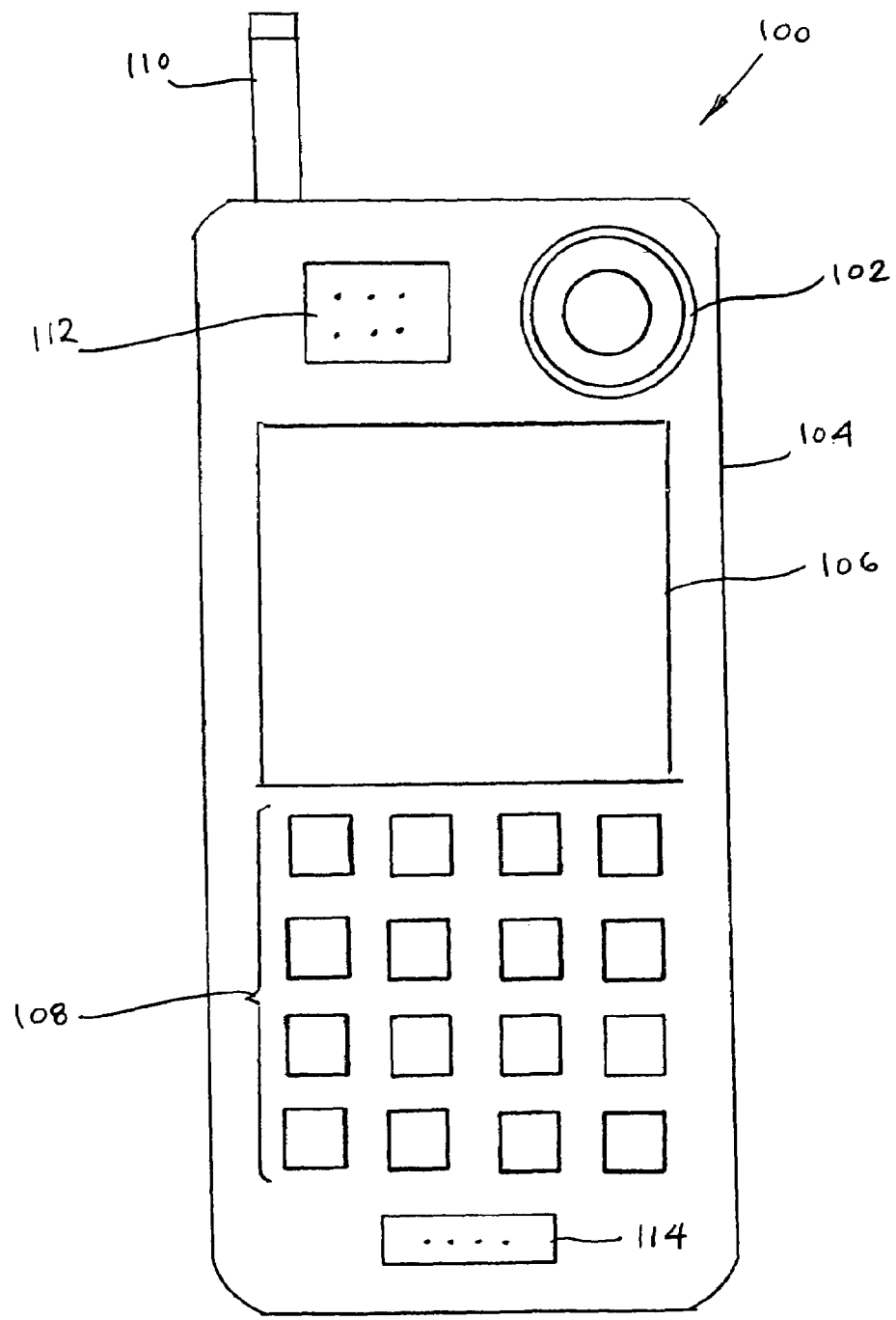
FIG. 1 shows an example of a hand-held processing device which incorporates a digital camera and in which the present invention may be implemented.

FIG. 1 shows a hand-held processing device 100 in which the present invention may be implemented. The hand-held device 100 in this example is in the form of a mobile telephone, although the invention is more generally applicable to any of a number of other types of hand-held processing devices, such as PDAs, palmtop or portable computers, etc. The term "hand-held processing device" as used herein is intended to include any type of information processing device which provides a user interface for control of information processing functions other than camera-related functions.

The hand-held device 100 has associated therewith a digital camera 102. The camera 102 in this example is integrated into the hand-held device 100, but it should be understood that this is not a requirement of the invention. The invention can be used, e.g., with digital camera modules that are inserted into or otherwise supported by a hand-held device, or any other type of camera arrangement that may be attached to, mounted on or otherwise associated with a hand-held processing device. The term "camera" as used herein is thus intended to include any type of image capture device or set of such devices which can be used in conjunction with a hand-held processing device to frame or track an object of interest in accordance with the techniques of the invention.

The hand-held device 100 further includes a housing 104, a display 106, a set of buttons 108, an antenna 110, a speaker 112 and a microphone 114. It should again be emphasized that the hand-held device 100 is merely an example of one type of hand-held device in which the present invention may be implemented. The particular configuration of elements shown in FIG. 1 is by way of example only.

The illustrative embodiments of the invention described herein provide tracking of an object of interest using the camera 102 associated with the hand-held device 100 of FIG. 1. The camera 102 in these embodiments may be a physically adjustable camera such as, e.g., a mechanical pan-tilt-zoom (PTZ) camera, or an electronically adjustable camera such as, e.g., a wide field of view camera having the ability to select a designated portion of a captured image for subsequent processing. The latter type of camera is also known as an electronic PTZ or e-PTZ camera. An advantage of this type of camera is that it avoids the need for mechanical controls, and is thus less complex and less expensive than the mechanical PTZ camera. As previously noted, however, the present invention is more generally applicable to other types of image capture devices. For example, the invention may be used with cameras having only mechanical or electronic zoom capability.

Figure 2:
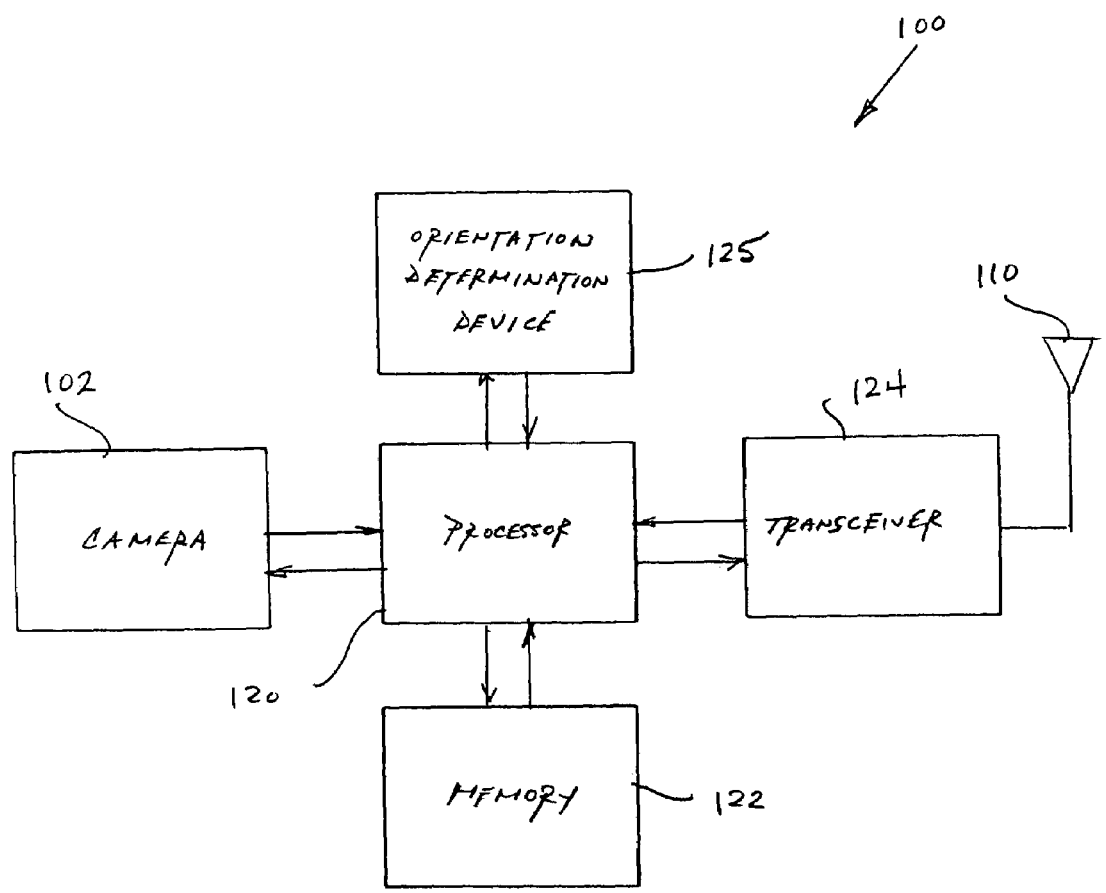
FIG. 2 is a block diagram of a hand-held processing device with an associated camera in accordance with a first illustrative embodiment of the invention.

FIG. 2 shows a simplified block diagram of a portion of the hand-held device 100. The portion of the device 100 shown includes the camera 102 and the antenna 110, as previously described in conjunction with FIG. 1. The device 100 in this embodiment further includes a processor 120, a memory 122, a transceiver 124, and an orientation determination device 125. The orientation determination device 125 may be, e.g., one or more conventional gyroscopes, each measuring rotation about a different axis. Other types of orientation determination devices may also be used.

An example of a type of gyroscope suitable for use in conjunction with the present invention is the Gyropoint product commercially available from Gyration Inc. One or more gyroscopes of this type, or other type of orientation determination device, can be implemented within the hand-held device 100 in a straightforward manner so as to allow the device to determine the manner in which the device is rotated relative to a given initialization position.

The output of the orientation determination device 125 in this embodiment is supplied to the processor 120. The processor 120 processes the output of the device 125 in accordance with one or more software programs stored in memory 122 so as to implement a tracking process of the present invention, as will be described in greater detail in conjunction with FIG. 3.

The term "processor" as used herein is intended to include a microprocessor, central processing unit (CPU), digital signal processor (DSP), microcontroller, application-specific integrated circuit (ASIC), or any other data processing element that may be utilized in a given hand-held processing device to provide the tracking functions described herein, as well as portions or combinations of such elements. The memory 122 may represent an internal electronic memory of the hand-held device, a peripheral memory coupled to or otherwise associated with the hand-held device, as well as combinations or portions of these and other types of storage devices.

Figure 3:
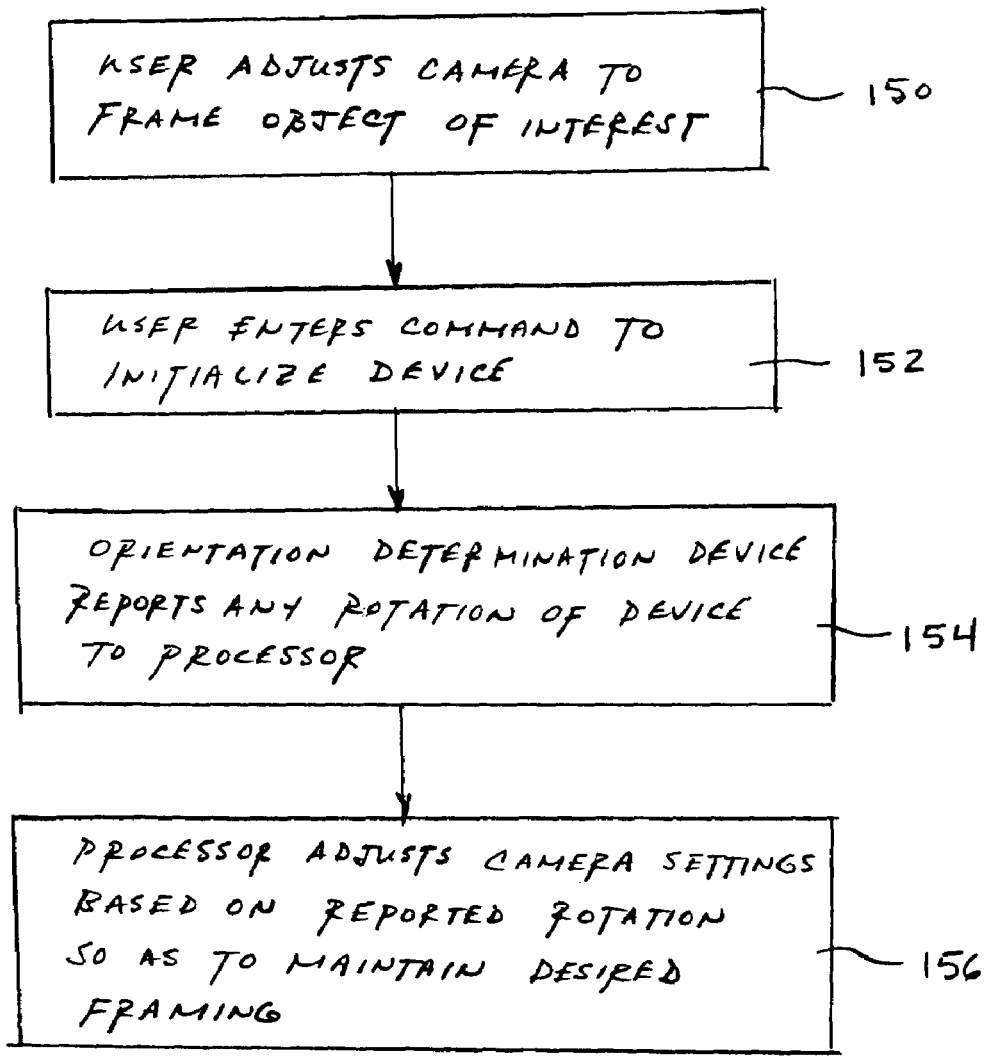
FIG. 3 is a flow diagram illustrating a framing and tracking process implemented in the hand-held processing device of FIG. 2 in accordance with the invention.

FIG. 3 is a flow diagram illustrating an example of a tracking process implemented in the device 100 of FIG. 2 in accordance with the present invention. In step 150, a user adjusts the camera to frame an object of interest. The object of interest may be, e.g., the user's head or face, a particular location within a room, or any other object of interest to the user. The user will typically adjust the camera by moving the hand-held device until the desired object of interest is properly framed within an image signal generated by the camera and displayed to the user via the device display 106. In other embodiments, the user could adjust manual camera controls so as to provide the desired framing.

After the object of interest is properly framed within an image signal generated by the camera, the user in step 152 enters a designated command to initialize the device for subsequent tracking of the object of interest. This command may be entered by the user pressing a particular button in the set of buttons 108, although any other command-entry mechanism could also be used, such as speech commands.

The orientation determination device 125 monitors the orientation of the hand-held device 100, and reports any rotation of the device to the processor 120, as indicated in step 154. The processor 120 then responds in step 156 by adjusting the camera settings based on the reported rotation. The camera settings are adjusted so as to maintain the desired framing of the object of interest, as established in the initialization step 152.

An example of the manner in which the detected rotation of the hand-held device 100 may be used to adjust the camera settings of a physically or electronically adjustable PTZ camera will now be described in greater detail. A fixed focal length camera is assumed for simplicity and clarity of illustration. The intrinsic calibration parameters of the camera can be described by an upper triangular matrix K as follows, $$K = \begin{pmatrix} f_x & s & \Delta_x \\ 0 & f_y & \Delta_y \\ 0 & 0 & 1 \end{pmatrix},$$

where $f_x$ and $f_y$ denote the focal length in x and y dimensions, respectively, s denotes the skew factor, i.e., a quantity which is non-zero only when the image axes are skewed (not perpendicular), and $\Delta_x$ and $\Delta_y$ denote the principal point of the camera, i.e., the intersection between the optical axis and the imaging plane of the camera. This form of the calibration matrix K is a standard form used in computer vision applications, and is described in greater detail in O. Faugeras, "Three Dimensional Computer Vision," MIT Press, 1993, which is incorporated by reference herein. In practice, the skew factor s is often set to zero so as to simplify the calibration matrix.

It should also be noted that there are a number of techniques known in the art for estimating the calibration matrix. Examples of such techniques are described in the above-cited O. Faugeras reference.

In the case of a fixed camera using electronic PTZ control, the calibration matrix is fixed and can be determined when the device is manufactured. For a mechanical PTZ camera, the calibration matrix will generally change when the zoom settings are adjusted. In this case, it is still possible to perform calibration in the manufacturing facility. More particularly, instead of a single fixed calibration matrix K, one could obtain a mapping between different zoom settings of the camera and a set of calibration matrices. An appropriate one of the matrices can then be selected for use, since the zoom setting will be known to the processor 120.

Alternatively, an image based technique could be used to "self-calibrate" the device. Such a technique may require the user to rotate the device in several different directions, with the calibration matrix being obtained using an approach such as that described in R. Hartley, "Self-calibration of Stationary Cameras," International Journal of Computer Vision, Vol. 22, No. 1, February 1997, pp. 5-23, which is incorporated by reference herein. In fact, since the camera rotation can be obtained from the orientation determination device 125, a single rotation of the device would be sufficient to obtain the calibration matrix, based on two images, one generated before the rotation and one generated after the rotation.

The coordinate system is attached to the principal point of the camera, with the z axis aligned to the camera optical axis. A point M=$[X, Y, Z]^T$ in three-dimensional (3D) space projects to an image point m=$[x, y, 1]^T$, where $$m = \frac{KM}{M \cdot \hat{z}}, \quad \hat{z} = [0, 0, 1]^T$$

Suppose the camera is rotated by rotation R in an external coordinate system. This is equivalent to the imaged scene being rotated by rotation −R in the coordinate system attached to the camera. After the rotation, point M is moved to point M':

$$M' = -RM$$

The projection of point M' onto the camera is an image point m':

$$m' = \frac{-KRM}{(RM) \cdot \hat{z}}$$

To obtain the relationship between image points m and m', perform the following substitution:

$$m' = \frac{-KR((M \cdot \hat{z})K^{-1}m)}{(RM) \cdot \hat{z}} = -\frac{M \cdot \hat{z}}{(RM) \cdot \hat{z}} KRK^{-1}m = \lambda(-KRK^{-1})m$$

This result indicates that the motion of image points caused by camera rotation can be described by a homography H=$-KRK^{-1}$. More specifically, an image point m is transformed by the homography into a point Hm in homogeneous coordinates. Notice that the scaling factor λ above can be easily determined, since the third coordinate of m' is 1.

When the device is rotated, the orientation determination device 125 provides the rotation matrix R. The matrix R can be combined with the calibration matrix K, obtained by the calibration techniques described above, to determine the homography matrix H.

The processor 120 can be configured to execute software for carrying out the above-described determination, and providing a corresponding adjustment in the camera settings. For example, the camera settings may be adjusted so as to counter the determined rotation R, such that the image points m and m' are approximately equivalent.

Figure 4:
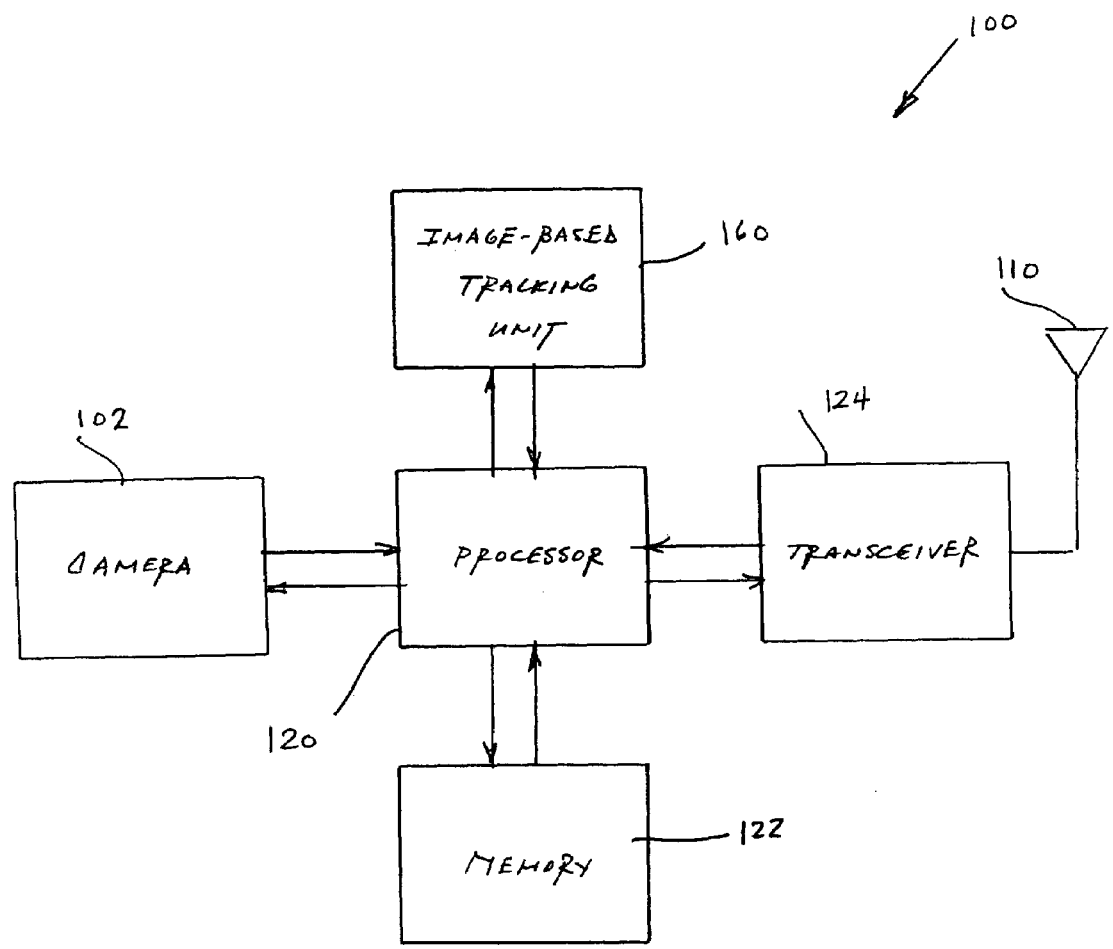
FIG. 4 is a block diagram of a hand-held processing device with an associated camera in accordance with a second illustrative embodiment of the invention.

FIG. 4 shows an alternative embodiment of the hand-held device 100 in accordance with the invention. This embodiment utilizes an image-based tracking process implemented in an image-based tracking unit 160 coupled to the processor 120. Although shown as separate from the processor 120 in FIG. 4, the tracking unit 160 may be implemented in whole or in part utilizing the processor 120 and software stored in the memory 122.

Figure 5:
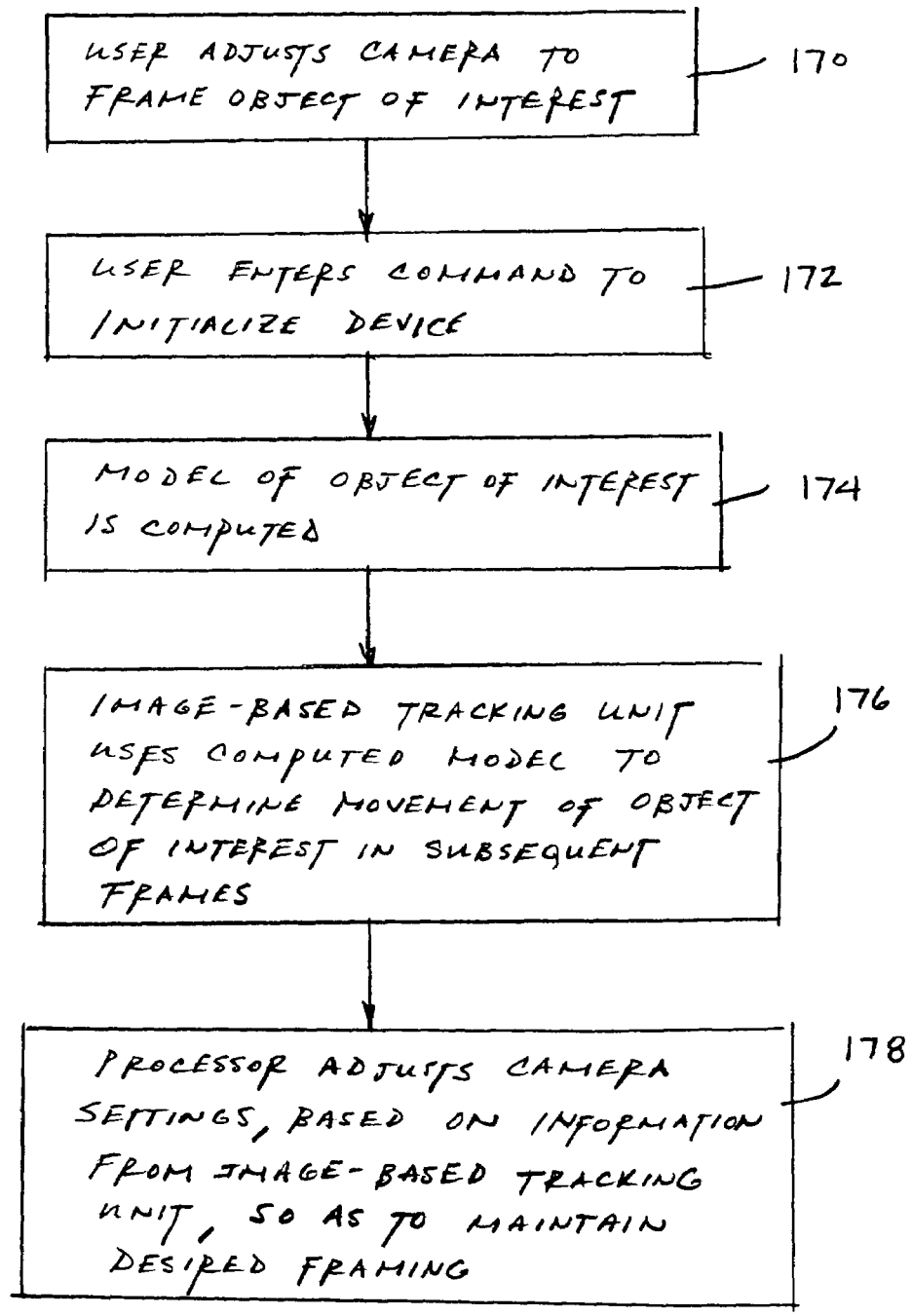
FIG. 5 is a flow diagram illustrating a framing and tracking process implemented in the hand-held processing device of FIG. 4 in accordance with the invention.

FIG. 5 is a flow diagram illustrating an image-based tracking process that may be implemented in the hand-held device 100 as shown in FIG. 4. Steps 170 and 172 are framing and initialization steps, respectively, and may be carried out in substantially the same manner described previously in conjunction with steps 150 and 152 of FIG. 3.

In step 174, a model of the object of interest is computed. The model may be a fully predetermined model, or may vary depending upon the particular type of object of interest, e.g., user face, room location, etc. The model may also be adjusted over time so as to "learn" the best parameters for tracking objects of interest generally or particular objects of interest. Numerous models used in conventional image-based tracking and suitable for use with the present invention are well known in the art, and are therefore not described in detail herein. By way of example, such models may incorporate color histogram generation, feature detection and extraction, template matching, etc.

The image-based tracking unit 160 uses the computed model in step 176 to determine movement of the object of interest in subsequent frames generated by the camera. For example, the image-based tracking unit may compare a recomputed model of the current frame to the model computed in step 174. A deviation in the models over a number of frames can be used to indicate a rotation or other type of movement of the camera or the object, using techniques that are well known in the art. In step 178, the processor 120 adjusts the camera settings, based on information from the image-based tracking unit 160, so as to maintain the desired framing as established in the initialization step 172.

Alternative embodiments of the invention may incorporate a hybrid approach using both the orientation determination device 125 and the image-based tracking unit 160. In such embodiments, confidence measures may be generated for the information supplied from the device 125 and unit 160, such that the more reliable of the two tracking adjustments may be used at any given time.

In the hybrid approach of the present invention, the orientation determination device 125 may determine changes in the orientation of the hand-held device and the information can be used to compensate for that motion and thus stabilize a sequence of output images. Then, if there is a moving object that a user wants to track, the tracking process is much easier when it is applied to the stabilized images. For example, frame differencing or motion vector estimation may be used to mark regions of motion in the stabilized images, and those marked regions correspond to moving objects. In a more general case, where the hand-held device not only rotates, but also translates, one can only partially stabilize the images using the information from the orientation determination device 125. In this case, background motion due to the hand-held device rotation will be removed, but there could still be background motion remaining due to the translation. However, the remaining background motion has a much simpler form than a general, unrestricted motion. Therefore, even in the general case, the orientation determination device 125 can provide useful information and can simplify image-based tracking.

The present invention provides a number of advantages over conventional devices. For example, by correctly framing a face or other object of interest, the invention can ensure that only the most meaningful image information is displayed to a user, which is becoming increasingly important as the display dimensions of hand-held devices continue to decrease. As another example, the invention can be utilized to track a user's face in visiophony applications, such that the hand-held device camera will present a properly-framed face in the images that it generates regardless of changes in the hand-held device orientation.

In addition, the invention can provide tracking of any target, location or other object of interest. For example, the camera may be mounted in such a way that it can perform not only visiophony by pointing in the direction of a user's face but may also be configured to allow the user subsequently to point at any other object in the room and let the device lock on this particular target.

The invention can also be used to provide image stabilization, producing a stable output image despite relatively small movements attributable to, e.g., a shaking hand.

It should also be noted that elements or groups of elements of the hand-held device 100 as shown in FIGS. 2 and 4 may represent corresponding elements of an otherwise conventional mobile telephone, PDA, portable computer or other type of hand-held processing device, as well as portions or combinations of these and other processing devices. Moreover, in these and other embodiments of the invention, some or all of the functions of the processor 120, memory 122 or other elements of the device 100 may be combined into a single processing element. For example, one or more of the elements of the device 100 as shown in FIGS. 2 and 4 may be implemented as an ASIC or other type of data processing element incorporated into or otherwise associated with a mobile telephone, PDA or other hand-held processing device.

The above-described embodiments of the invention are intended to be illustrative only. For example, the invention can be used to implement tracking of any desired object of interest, and in a wide variety of applications involving mobile telephones, PDAs, portable computers or other hand-held processing devices. In addition, although illustrated using a single camera associated with a hand-held device, the invention can be implemented using multiple cameras associated with a given hand-held device. As previously noted, the invention can also be implemented at least in part in the form of one or more software programs which are stored in a memory or other storage medium incorporated in, coupled to or otherwise associated with a hand-held processing device, and executed by a processor of the device. These and numerous other embodiments within the scope of the following claims will be apparent to those skilled in the art.

What is claimed is:

1. A method for automatically framing and tracking an object of interest using a video camera integrated into hand-held processing devices including PDAs, mobile telephones, palmtops, and portable computers to insure stability of the image content as a user manipulates the device, the method comprising the steps of:

providing said video camera with a wide field of view;

continuously detecting relative movement associated with the hand-held device that tracks the object of interest within a displayed image generated by said camera, the relative movement depending on the tracking of the object of interest; and continuously electronically adjusting the camera, without use of a motor, in response to the detected relative movement, so as to maintain a desired framing and tracking of the object of interest within an image and/or successive images, as long as the image or images remain in the field of view generated by the camera for selectively providing either one of a still picture of the object or video image of the object, respectively, for providing a stable image in the presence of movement of a user's hand holding said device;

wherein the framing of the object involves creating a model of the object; and wherein the model is adjusted based on a history of prior obtained plurality of calibration parameters used to represent one or more matrices used for the framing and tracking of the object.

2. The method of claim 1 wherein the camera is physically adjustable by a user.

3. The method of claim 1 wherein the camera has one or more of solely electronically adjustable pan setting, an adjustable tilt setting, and an adjustable zoom setting, performed without use of a motor.

4. The method of claim 1, wherein said step of continuously electronically adjusting the camera is based at least in part on an output of an orientation determination device integrated into or otherwise associated with the hand-held device, for detecting relative movement between said device and an object of interest caused by movement of a user's hand.

5. The method of claim 4 wherein the orientation determination device comprises one or more gyroscopes integrated into the hand-held device.

6. The method of claim 1, wherein said step of continuously electronically adjusting the camera is based at least in part on an output of an image processing operation applied to an image generated by the camera.

7. The method of claim 1, wherein said step of continuously electronically adjusting the camera is based at least in part on a hybrid combination of an orientation determination operation and an image processing operation.

8. The method of claim 1, wherein the detecting of the relative movement between the hand-held device and the object of interest occurs in response to initialization by the user.

9. The method of claim 8, wherein the initialization is a manual initialization.

10. The method of claim 8, wherein the initialization is a voice-activated initialization.

11. The method of claim 1, wherein the camera is electronically configured to include a plurality of calibration parameters represented as an upper triangular matrix.

12. The method of claim 11, wherein the plurality of calibration parameters of the matrix are adjusted at a time of manufacturing and cannot be subsequently modified by the user of the camera.

13. The method of claim 11, wherein the plurality of calibration parameters of the matrix are adjusted based on one or more actions performed by the user of the camera at a time of use of the camera.

14. The method of claim 13, wherein the one or more actions include zoom setting actions.

15. The method of claim 1, wherein the camera is electronically configured to include a plurality of calibration parameters represented by a plurality of matrices.

16. The method of claim 15, wherein a select number of the plurality of matrices are manipulated in conjunction with a plurality of different zoom settings in order to frame the object.

17. The method of claim 1, wherein the relative movement between the hand-held device and the object of interest includes processing a single movement.

18. The method of claim 1, wherein the relative movement between the hand-held device and the object of interest includes processing a plurality of movements.

19. The method of claim 1, wherein the camera is electronically configured to include a plurality of calibration parameters represented as a homography matrix, where the homography matrix is composed of a rotation matrix and a calibration matrix.

20. The method of claim 1, wherein the model is compared against a predetermined model.

21. The method of claim 1, wherein the model continuously learns of a select number of optimal calibration parameters derived from the history of the prior obtained plurality of calibration parameters for using the select number of the optimal calibration parameters in the framing and tracking of the object.

22. An apparatus for automatically framing and tracking an object of interest, the apparatus comprising:
- a hand-held processing device including PDA's, mobile telephones, palmtops, and portable computers, having at least one video camera integrated therein, the hand-held device further comprising:
- a processor operative to continuously monitor the detection of relative movement associated with the hand-held device that tracks the object of interest, due to movement of a user's hand holding said device, the relative movement depending on the tracking of the object of interest,
- said processor being responsive to the detected relative movement for continuously solely electronically adjusting, without use of a motor, at least one setting of the camera so as to continuously maintain a desired framing of the object of interest within an image generated by the camera as a user manipulates the device, for providing a stable image;
- wherein the framing of the object involves creating a model of the object; and
- wherein the model is adjusted based on a history of prior obtained plurality of calibration parameters used to represent one or more matrices used for the framing and tracking of the object.

23. The apparatus according to claim 22, wherein the model continuously learns of a select number of optimal calibration parameters derived from the history of the prior obtained plurality of calibration parameters for using the select number of the optimal calibration parameters in the framing and tracking of the object.

24. An article of manufacture comprising a storage medium for storing one or more programs for tracking an object of interest using at least one video camera having integrated into a hand-held processing device, including PDA's, mobile telephones, palmtops, and portable computers, wherein the one or more programs when executed by a processor implement the steps of:
- detecting relative movement associated with the hand-held device that tracks the object of interest, the relative movement depending on the tracking of the object of interest; and
- adjusting solely electronically, without use of a motor, at least one setting of the camera, in response to the detected relative movement, so as to maintain a desired framing of the object of interest within an image generated by the camera, for providing a stable image;
- wherein the framing of the object involves creating a model of the object; and
- wherein the model is adjusted based on a history of prior obtained plurality of calibration parameters used to represent one or more matrices used for the framing and tracking of the object.

25. The article of manufacture according to claim 24, wherein the model continuously learns of a select number of optimal calibration parameters derived from the history of the prior obtained plurality of calibration parameters for using the select number of the optimal calibration parameters in the framing and tracking of the object.

* * * * *